US008036161B2

(12) United States Patent
Nagarajan

(10) Patent No.: US 8,036,161 B2
(45) Date of Patent: Oct. 11, 2011

(54) WIRELESS SWITCH WITH VIRTUAL WIRELESS SWITCH MODULES

(75) Inventor: Ramakrishnan Nagarajan, Sunnyvale, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 632 days.

(21) Appl. No.: 12/182,852

(22) Filed: Jul. 30, 2008

(65) Prior Publication Data
US 2010/0027516 A1 Feb. 4, 2010

(51) Int. Cl.
*H04W 4/00* (2009.01)
(52) U.S. Cl. .................. 370/328; 370/338; 370/401
(58) Field of Classification Search .............. None
See application file for complete search history.

(56) References Cited

U.S. PATENT DOCUMENTS

| | | | |
|---|---|---|---|
| 5,550,816 A | 8/1996 | Harwick et al. | |
| 6,055,433 A | 4/2000 | Yuan et al. | |
| 6,404,772 B1 | 6/2002 | Beach et al. | |
| 6,795,701 B1 | 9/2004 | Baker et al. | |
| 6,901,270 B1 | 5/2005 | Beach | |
| 6,928,282 B2 | 8/2005 | Taniguchi | |
| 6,965,605 B1* | 11/2005 | Amos et al. | 370/401 |
| 7,113,498 B2* | 9/2006 | Bajic | 370/338 |
| 7,173,922 B2 | 2/2007 | Beach | |
| 7,173,923 B2 | 2/2007 | Beach | |
| 7,606,208 B2* | 10/2009 | Benveniste | 370/338 |
| 2001/0021175 A1 | 9/2001 | Haverihen | |
| 2002/0021689 A1 | 2/2002 | Robbins et al. | |
| 2002/0067704 A1 | 6/2002 | Ton | |
| 2002/0136226 A1 | 9/2002 | Christoffel et al. | |
| 2002/0176387 A1 | 11/2002 | Wilmer et al. | |
| 2003/0104814 A1 | 6/2003 | Gwon et al. | |
| 2003/0112820 A1 | 6/2003 | Beach | |
| 2003/0128689 A1 | 7/2003 | Pierce, Jr. et al. | |
| 2003/0135626 A1 | 7/2003 | Ray et al. | |
| 2003/0165144 A1 | 9/2003 | Wang | |
| 2003/0179742 A1 | 9/2003 | Ogier et al. | |
| 2003/0224788 A1 | 12/2003 | Leung et al. | |
| 2004/0006708 A1 | 1/2004 | Mukherjee et al. | |
| 2004/0047320 A1* | 3/2004 | Eglin | 370/338 |
| 2004/0095932 A1 | 5/2004 | Astarabadi et al. | |
| 2004/0103282 A1 | 5/2004 | Meier et al. | |
| 2004/0122976 A1 | 6/2004 | Dutta et al. | |

(Continued)

FOREIGN PATENT DOCUMENTS
EP 1117222 7/2001
(Continued)

OTHER PUBLICATIONS

International Search Report for International Application No. PCT/US2006/014075 mailed Oct. 6, 2006.

(Continued)

*Primary Examiner* — Robert Scheibel

(57) ABSTRACT

A wireless switch device is provided that includes a first wired Ethernet interface and a second wired Ethernet interface, and a plurality of virtual wireless switch modules (VWSMs) implemented within the wireless switch device. The VWSMs include a first VWSM that is coupled to a first access port via the first wired Ethernet interface that is allocated to the first VWSM, and a second VWSM that is coupled to a second access port via the second wired Ethernet interface that is allocated to the second VWSM. The first VWSM can be control and manage the first access port, and the second VWSM can control and manage the second access port.

12 Claims, 5 Drawing Sheets

U.S. PATENT DOCUMENTS

| | | | |
|---|---|---|---|
| 2004/0214576 | A1 | 10/2004 | Myers et al. |
| 2004/0221042 | A1 | 11/2004 | Meier |
| 2005/0047420 | A1 | 3/2005 | Tanabe et al. |
| 2005/0074015 | A1 | 4/2005 | Chari et al. |
| 2005/0213582 | A1 | 9/2005 | Wakumoto et al. |
| 2005/0237962 | A1 | 10/2005 | Upp et al. |
| 2006/0045069 | A1 | 3/2006 | Zehavi et al. |
| 2006/0179307 | A1 | 8/2006 | Stieglitz et al. |
| 2007/0121565 | A1 | 5/2007 | Halasz et al. |
| 2008/0221918 | A1* | 9/2008 | Petersen et al. .............. 705/2 |
| 2009/0019539 | A1* | 1/2009 | Jonnalagadda et al. ........ 726/14 |
| 2009/0198808 | A1* | 8/2009 | Cai et al. ....................... 709/223 |
| 2009/0199281 | A1* | 8/2009 | Cai et al. ........................... 726/7 |
| 2009/0290537 | A1* | 11/2009 | Berglund et al. ............. 370/328 |

FOREIGN PATENT DOCUMENTS

| | | |
|---|---|---|
| EP | 1401151 | 3/2004 |
| EP | 1408653 | 4/2004 |
| EP | 1528747 | 5/2005 |
| WO | 2001063943 | 8/2001 |
| WO | 2002043348 | 5/2002 |
| WO | 2003077429 | 9/2003 |
| WO | 2003093951 | 11/2003 |
| WO | 2003101131 | 12/2003 |
| WO | 2004017172 | 2/2004 |
| WO | 2004098143 | 11/2004 |
| WO | 2006066007 | 6/2006 |
| WO | 2006128157 | 11/2006 |

OTHER PUBLICATIONS

International Search Report for International Application No. PCT/US2006/013888 mailed Nov. 8, 2006.
International Search Report for International Application No. PCT/US2006/014074 mailed Sep. 8, 2006.
International Search Report for International Application No. PCT/US2006/014076 mailed Sep. 18, 2006.
International Search Report for International Application No. PCT/US2006/020216 mailed Oct. 30, 2006.
International Search Report for International Application No. PCT/US2006/020880 mailed Oct. 20, 2006.
International Search Report for International Application No. PCT/US2006/025356 mailed Nov. 30, 2006.
Dmitry Olshansky: "JPF Usage Tutorial (Demo application explained)" Internet Article, [Online] Mar. 9, 2005, pp. 1-7, XP002400718, JPF Homepage, Retrieved from the Internet: URL:http://web.archive.org/web/20050309192800/jpf.sourceforge.net/tutorial.html>, [retrieved on Sep. 27, 2006], p. 2, section "Preparing parameters to start up plug-in manager", paragraph 1—paragraph 3, p. 4, whole page.
Anonymous: "Welcome to Eclipse" Internet Article, [Online] 2004, XP002400727, Eclipse Homepage, Retrieved from the Internet: URL:http://www.eclipse.org/documentation/pdf/org.eclipse.platform.doc.isv_3.0.1.pdf>[retrieved on Sep. 27, 2006], p. 9, paragraph 1—paragraph 6; p. 10, table on bottom of page; p. 11, paragraph 2—paragraph 3; p. 12, paragraph 1—paragraph 3; p. 13, paragraph 1—paragraph 3; p. 78, paragraph 1paragraph 2; p. 79, section "Hello world view", whole section; p. 85, figure; p. 92, section Installing example via the.
Azad Bolour: "Notes on the Eclipse Plug-in Architecture" Internet Article, [Online] Jul. 10, 2003, pp. 1-26, XP002400728, Eclipse Homepage, Retrieved from the Internet: URL:http://web.archive.org/web/20030710042641/http://eclipse.org/articles/ Article-Plug-in-architecture/plugin_architecture.html> [retrieved on Sep. 27, 2006], p. 1, section "Introduction", paragraph 1—paragraph 2; p. 2, paragraph 1—paragraph 3; p. 3 section 2.3, paragraph 1—p. 4, paragraph 7.
David Flanagan: "Java Foundation Classes in a Nutshell" Sep. 1999, O'Reilly & Associates, Inc., 101 Morris Street, Sebastopol, CA 95472, U.S.A., XP002400745, section 7.2.1, whole section.
Dmitry Olshansky: "Class StandardPathResolver" Internet Article, Mar. 9, 2005, XP002400737, JPF Homepage, section "resolvePath", whole section.
Dromb Bucknell University R, "Dynamic Host Configuration Protocol," IETF Standard, Internet Engineering Task Force, ITEF, CH, Mar. 1997.
S. Glass, Sun Microsystems, Mobile IP Agents as DHCP Proxies, IETF Standard-Working-Draft, Internet Engineering Task Force, IETF, Ch. No. 1, Mar. 2, 2003 [abstract].
Annex to Form PCT/ISA/206 Communication Relating to the Results of the Partial International Search for International Application No. PCT/US2007/072350, mailed Nov. 22, 2007.
Ogier SRI International F. Templin Nokia M. Lewis SRI International R: "Topology Dissemination Based on Reverse-Path Forwarding (TBRPF); rfc3684.txt;" IETF Standard, Internet Engineernig Task Force, IETF, CH, Feb. 2004, XP015009465; ISSN: 0000-0003; abstract; Chapters 5.1 and 7.
Annex to Form PCT/ISA/206 Communication Relating to the Results of the Partial International Search for International Application No. PCT/US2007/072556, mailed Dec. 28, 2007.
Annex to Form PCT/ISA/206, Communication Relating to the Results of the Partial International Search for International Application No. PCT/SU2007/073917, mailed Jan. 29, 2008.
Leary, Jonathan et al. "Wireless LAN Fundamentals Mobility," CISCO Press article, Jan. 9, 2004, pp. 1-8.
Symbol Technologies, Inc. "ES 3000 Ethernet Switch, Designed for Enterprise Wireless Networking Wireless Switch Environments," Oct. 2004.
Symbol Technologies, Inc. "What is a Wireless Switch and the Value of the Overlay Architecture?" Technical White Paper, Jan. 2005.
Symbol Technologies, Inc. "Deutsch Messe AG Chooses the Wireless Switch System from Symbol Technologies to Power World's Largest Hotspot at CeBIT 2003," Oct. 2003.
The Tolly Group "Wireless TCO: The Value of an Overlay Network," White Paper, Jun. 2004.
Symbol "Symbol Wireless Switch System: The Intelligent Foundation for Enterprise Mobility," Nov. 2006.
Inkra Networks, "Inkra 4000 Virtual Service Switch Architecture," Jul. 18, 2002, pp. 3-12, Inkra Networks Corp., Fremont, CA, USA.
Wireless Switch WS5100, Feb. 2005, Retrieved from Internet URL: http:www.jmosystems.com/docs/WD5100TB.pdf.
International Search Report, PCT/US2009/050351 dated Oct. 27, 2009.

* cited by examiner

| | 310 | 330 |
|---|---|---|
| | SERVICE | DETAILS |
| 312 | NETWORKING | · Layer 2 Interface Management (Physical Ports)<br>· Lyere 3 Interface Management (IP Interfaces)<br>· DNS<br>· DHCP Client<br>· DHCP Server<br>· Route-Table Management | 332 |
| 314 | WIRELESS | · Access-Port and Radio Configuration and Management<br>· WLAN Configuration and Management<br>· Mobile-Unit Database<br>· Layer 3 Mobility Service<br>· Wireless Hotspot Service | 334 |
| 316 | CONFIGURATION | · Configuration Management<br>· Image Management | 336 |
| 318 | SECURITY | · DOS Attack Detection<br>· Stateful and Stateless Packet Filtering using Access-Lists<br>· Role-Based Firewall<br>· AAA (Authentication/Authorization/Accounting) Client<br>· RADIUS Server (this is a AAA server)<br>· User Management; Password Management | 338 |
| 320 | ADMINISTRATION | · CLI<br>· SNMP Server<br>· Monitoring, Events, Alarms<br>· Telnet/SSH/HTTP/HTTPS/TFTP/FTP/SCP/SFTP Services<br>· Certificate Managment<br>· Syslog Server<br>· Debugging, Tracing, Archiving | 340 |
| 322 | APPLICATION SERVICES | · NTP Server<br>· Real Time Locationing System<br>· Health Checking<br>· Statistics | 342 |
| 324 | HIGH AVAILABILITY | · VRRP<br>· Clustering Service | 344 |
| 326 | PACKET FORWARDING SERVICES | · Layer 2 Bridge<br>· Layer 3 Router<br>· Wireless (802.11) Packet Forwarder<br>· Flow-Table Management | 346 |
| 328 | SYSTEM MANAGEMENT | · Process Monitoring<br>· CPU Management<br>· Memory Managment | 348 |

*FIG. 3*

WIRELESS SWITCH WITH VIRTUAL WIRELESS SWITCH MODULES

TECHNICAL FIELD

The present invention generally relates to computer networks and, more particularly, to wireless switches.

BACKGROUND

A wireless access point (AP) is a device that allows wireless communication devices to connect to a wireless network. The AP connects to a wired network, and can relay data between the wireless computing devices and wired computing devices on the network. The AP directly serves as the point of interconnection between the WLAN and the fixed wired network and allows wireless communication devices to be quickly and easily connected to a wired LAN. Each access point has full MAC functionality and sufficient program logic and processing power to allow it to enforce policies relating to access and usage. The wireless protocol terminates at the access point. A conventional wireless local area network (WLAN) can include a plurality of such access points.

With the proliferation of access point based wireless local area networks, to reduce the cost of implementing a WLAN, a wireless switch/access port architecture has been developed that employs simplified access ports in conjunction with a wireless switch device (or other centralized controller). These access ports, sometimes referred to as thin access points, have reduced MAC functionality in comparison to regular or "fat" access points, and many of the higher level MAC functions that would be implemented in an access point are implemented at the wireless switch device instead. The wireless switch device serves as a master controller that provides a single point of administration for all access ports it controls. Among other things, a wireless switch device configures controls, manages, and secures the environment for one or more access ports. In wireless switch/access port architecture, the wireless protocol terminates at the wireless switch.

As with many other types of networking devices, it is beneficial or sometimes necessary to deploy multiple wireless switch devices.

For instance, in some situations, a network architect will decide to deploy multiple wireless switch devices to divide a large WLAN with many access points into multiple IP (layer 3) subnets, where each wireless switch defines a subnet and controls one or more APs that belong to that subnet. Subdividing a WLAN into multiple subnets has several advantages (e.g., containment of broadcast traffic to a single subnet, limiting the effect of failure of network elements to a small network segment, etc.).

In other situations it is necessary to deploy multiple wireless switch devices. A wireless switch device has a fixed number of physical resources. When the number of access ports that need to be deployed in a WLAN exceeds the physical resources of the wireless switch, it becomes necessary to deploy another wireless switch device.

Alternatively, if a Wireless Internet Service Provider (WISP) provides wireless services to multiple independently operating customers, then the WISP needs to deploy one or more wireless switches per customer even though wireless switching resources of each wireless switch may not be fully utilized by a particular customer. When a new customer is added, a new wireless switch device needs to be added to the network, and when an existing customer leaves, the wireless switch for that customer needs to be removed and reconfigured for use by the next customer.

Wireless switches are highly specialized networking devices and can be relatively expensive. As such, one drawback of deploying multiple wireless switch devices is added cost. Moreover, when multiple wireless switch devices are deployed, each needs to be managed by the network administrator since they are physically separate devices.

SUMMARY

In one embodiment, a wireless switch device is provided that includes a first wired Ethernet interface and a second wired Ethernet interface, and a plurality of virtual wireless switch modules (VWSMs) implemented within the wireless switch device. The VWSMs include a first VWSM that is coupled to a first access port via the first wired Ethernet interface that is allocated to the first VWSM, and a second VWSM that is coupled to a second access port via the second wired Ethernet interface that is allocated to the second VWSM. The first VWSM can control and manage the first access port, and the second VWSM can control and manage the second access port independently of the first access port.

BRIEF DESCRIPTION OF THE DRAWINGS

The present invention will be described in conjunction with the following drawing figures, wherein like numerals denote like elements.

FIG. 3 is a list of services/functions provided by a wireless switch device according to one exemplary embodiment;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, or brief summary. As used herein, the word "exemplary" means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Exemplary Network Architecture

Figure 1:
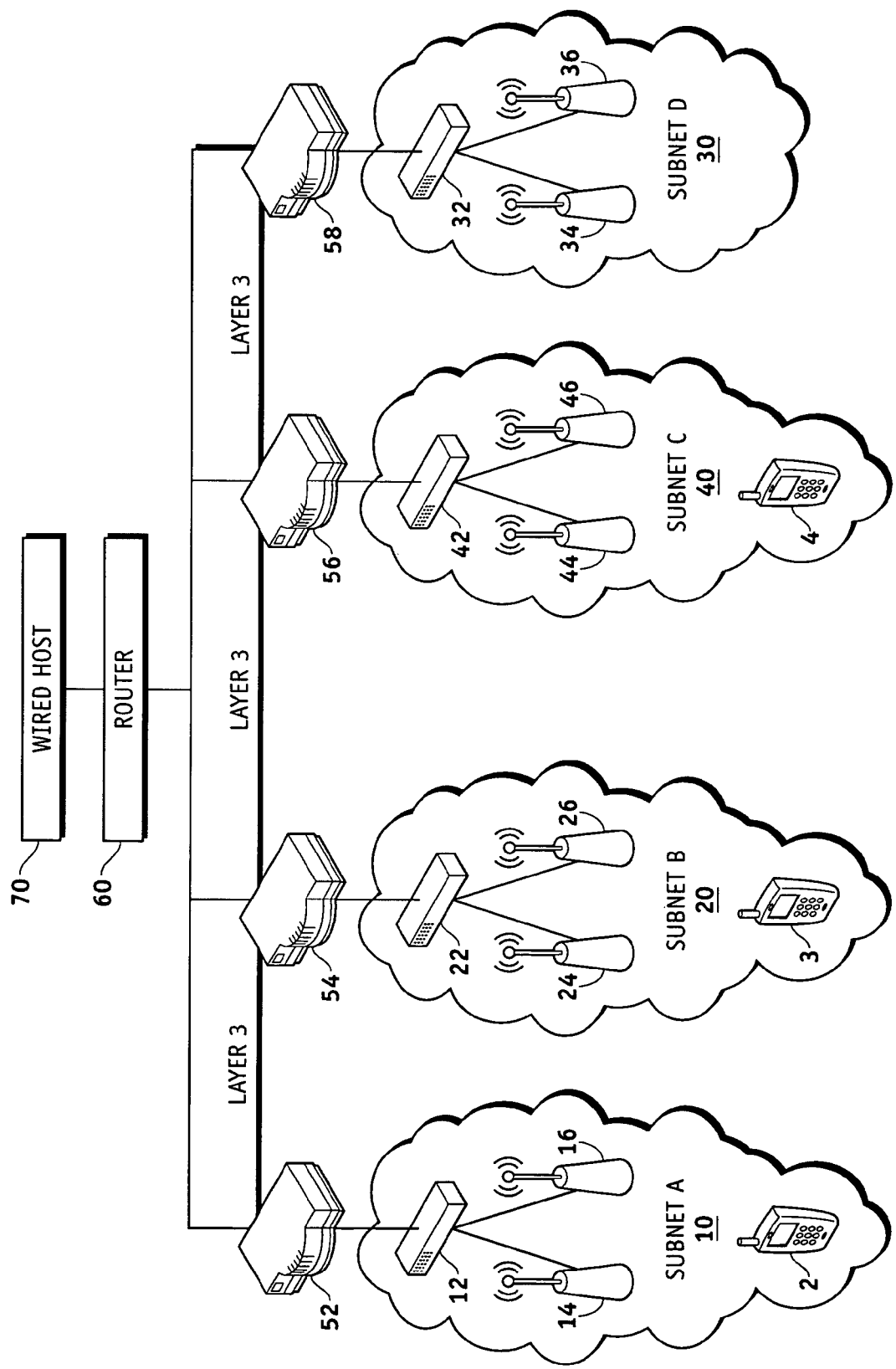
FIG. 1 is a simplified block diagram of a wireless local area network (WLAN)

FIG. 1 is a simplified block diagram of a wireless local area network (WLAN) 100. The WLAN 100 shown in FIG. 1 comprises a number of wireless client devices 2, 3, 4, wireless switch devices 12, 22, 32, 42, L2 switch devices 52, 54, 56, 58 coupled to the wireless switch devices 12, 22, 32, 42, a L3 router 60 coupled to each of the L2 switches 52, 54, 56, 58, and a wired host system 70 coupled to the L3 router 60.

Wireless switch device 12 supports the subnet (A) 10 and is coupled to access ports (APs) 14, 16, wireless switch device 22 supports subnet (B) 20 and is coupled to access ports (APs) 24, 26, wireless switch device 42 supports subnet (C) 40 and is coupled to access ports (APs) 44, 46, and wireless switch device 32 supports subnet (D) 30 and is coupled to access ports (APs) 34, 36. The wireless switch devices and associated access ports are typically separate physical devices. However, in one embodiment, the access ports associated with a particular wireless switch device can be implemented within or as part of the wireless switch device. Moreover, although not illustrated, in some implementations, to increase the number of APs that can be coupled at a particular wireless switch device, additional L2 switches (not shown) and/or L3 routers (not shown) can be coupled between the wireless switch devices 12, 22, 32, 42 and corresponding APs that are coupled to each of the wireless switch devices 12, 22, 32, 42. The wireless client devices 2, 3, 4 can communicate with each other and/or with a wired host system 70 through a network that includes the access ports 16, 24, 46, the wireless switch devices 12, 22, 42, L2 switch devices 52, 54, 56, and the L3 router 60.

As used herein, a "wireless client device" can generally refer to a portable or "mobile" wireless communication device or other hardware with which an access network communicates. The wireless client devices 2, 3, 4 can physically move around the WLAN, but at any given time may be mobile or stationary and can include devices that communicate through a wireless channel or through a wired channel. The WCDs 2, 3, 4 can be any of a number of types of mobile computing devices, which include without limitation, mobile stations (e.g. mobile telephone handsets, mobile radios, mobile computers, laptop computers, a PC card, personal digital assistants (PDAs), or the like), computers, wireless gaming devices, access terminals, subscriber stations, user equipment, compact flash, external or internal modem, or any other devices configured to communicate via wireless communications. Although not illustrated in FIG. 1, the WCDs 2, 3, 4 can comprise one or more processors/controllers, transceivers, and/or other suitable components. WCDs are well-known in the art and need not be discussed at length here. Although not illustrated, each AP can serve multiple wireless client devices within a defined network area.

The access ports 14, 16, 24, 26, 34, 36, 44, 46 are devices that enable remote wireless stations to communicate with a local area network (LAN). In general, an access port is a network-capable device containing a transceiver and antenna for transmitting signals to and receiving signals from the remote client devices or stations. Access ports are sometimes referred to as thin access points (as opposed to "access ports"). Access ports differ from regular or "fat" access points in that access points have full MAC functionality, whereas access ports have reduced MAC functionality. Another difference is that access ports are usually implemented in conjunction with a wireless switch (or other centralized controller) and many of the higher level MAC functions that would be implemented in an access point are implemented at the wireless switch instead, and the wireless switch provides a single point of administration for all thin APs it configures, controls, manages, and secures the environment for these thin APs. By contrast, a fat AP is usually implemented without a wireless switch, and has sufficient program logic and processing power to allow it to enforce policies relating to access and usage, rather than working under the supervision of a centralized controller (e.g., wireless switch). A fat AP directly serves as the point of interconnection between the WLAN and a fixed wire network and allows wireless communication devices to be quickly and easily connected to a wired LAN. In the fat AP implementations, the wireless protocol terminates at the AP as opposed to the wireless switch as in a wireless switch/access port architecture.

The wireless switch devices 12, 22, 32, 42 are coupled to at least one access port (AP) (and possibly multiple APs). For sake of simplicity, in FIG. 1 each of the wireless switches 12, 22, 32, 42 is shown as having two APs associated therewith. However, it will be appreciated that, while not shown in FIG. 1, each of the wireless switches can have more than less than two APs or more than two APs associated therewith.

As used herein, the term "wireless switch device" refers to a network entity that configures, controls and manages a plurality of access ports. Examples of wireless switch devices are disclosed in, for example, U.S. Pat. No. 7,173,922, entitled "Multiple wireless local area networks occupying overlapping physical spaces" assigned to the assignee of the present invention, its contents being incorporated by reference in its entirety herein; and U.S. Pat. No. 7,173,923, entitled "Cell Controller Adapted to Perform A Management Function" assigned to the assignee of the present invention, its contents being incorporated by reference in its entirety herein. In U.S. Pat. Nos. 7,173,922, and 7,173,923, a wireless switch is referred to as a cell controller. Wireless switches are also described, for example, in United States Patent Application Serial Number US 2007/0177435 A1, filed Jan. 11, 2007, entitled "System For Multiple Wireless Local Area Networks," and assigned to the assignee of the present invention, which is incorporated herein by reference in its entirety; United States Patent Application Publication Number 2007/0109994 A1 entitled "Cell Controller For Multiple Wireless Local Area Networks," filed Jan. 11, 2007, which is incorporated by reference herein in its entirety; U.S. Pat. No. 7,885,233, issued Feb. 8, 2011, entitled "FORWARDING BROADCAST/MULTICAST DATA WHEN WIRELESS CLIENTS LAYER 3 ROAM ACROSS IP SUBNETS IN A WLAN," and assigned to the assignee of the present invention, which is incorporated herein by reference in its entirety; and U.S. patent application Ser. No. 11/831,781 entitled "ARCHITECTURE FOR SEAMLESS ENFORCEMENT OF SECURITY POLICIES WHEN ROAMING ACROSS IP SUBNETS IN IEEE 802.11 WIRELESS NETWORKS," assigned to the assignee of the present invention and filed Jul. 31, 2007, which is incorporated by reference herein in its entirety.

As described, for example, in U.S. Pat. No. 7,173,923, much of the MAC layer functionality that was traditionally provided at a conventional access point can be implemented in the wireless switch device so that "dumb" or "thin" access ports can be used instead of "smart" or "thick" access points. An exemplary wireless switch will be described below with reference to FIGS. 2 and 3.

The wired Layer 2 (L2) switch devices 12, 22, 32, 42 (also known as an Ethernet switches) are networking devices that operate at Layer 2, sometimes referred to as the Data Link Layer, of the well-known seven layer Open Systems Interconnection (OSI) communication model. A wired L2 switch typically provides wired networking services/functions and features such as Layer 2 Ethernet switching, Layer 3 routing, firewall service, etc. As such, a wired L2 switch typically includes wired input/output interfaces such as Ethernet ports, token ring ports, etc., and includes modules for performing packet forwarding. A wired L2 switch typically receives data packets and forwards them based on information contained in their headers, which for a wired L2 switch are headers corresponding to L2 wired networking protocols including IEEE 802.3 Ethernet, IEEE 802.5 token-ring, etc.

The L3 router 60 provides connectivity to the wired host system 70. Each interface on the router 60 is associated with an independent IP subnet (e.g. subnet A, subnet B) as shown in FIG. 1. Traffic that goes between interfaces (i.e. between IP subnets) is routed using standard rules of IP. The wired host system 70 can be, for example, a workstation, any application server including mail server, web server, file server, DNS server, streaming video server, instant messaging server, gaming server, etc.

Figure 2:
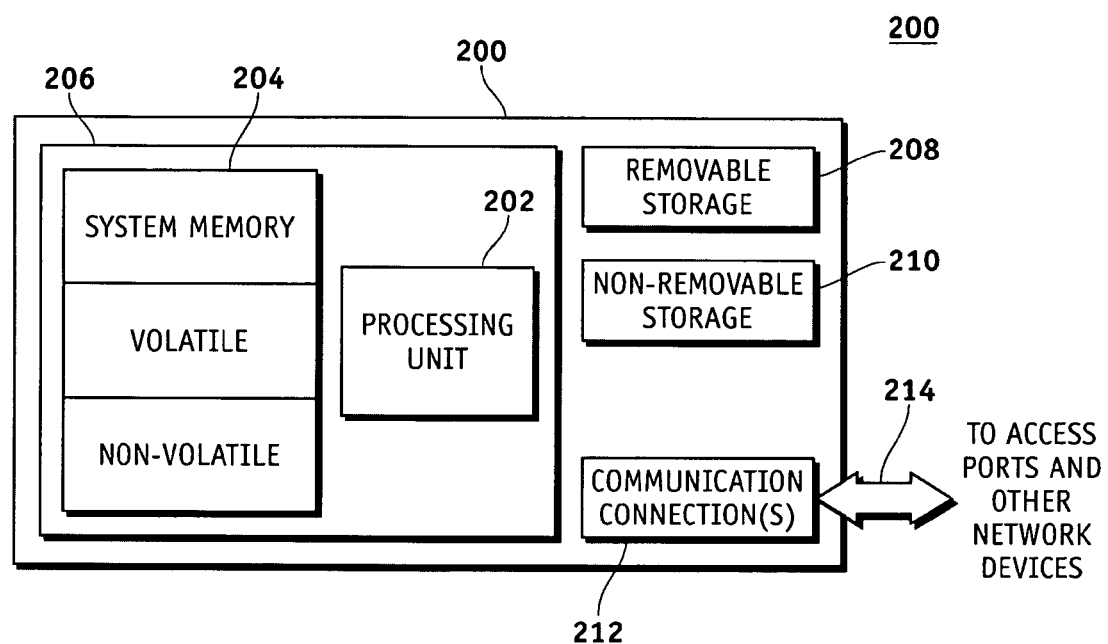
FIG. 2 is a simplified block diagram of an exemplary wireless switch device.

FIG. 2 is a simplified block diagram of an exemplary wireless switch 200. Wireless switch 200 is only one example of a wireless switch and is not intended to suggest any limitation as to the scope of use or functionality of the invention. Other well known configurations that may be suitable for use with the invention include, but are not limited to, personal computers, server computers, multiprocessor systems, microprocessor-based systems, programmable consumer electronics, network PCs, minicomputers, mainframe computers, distributed computing environments that include any of the above systems or devices, and the like.

Wireless switch 200 and certain aspects of embodiments of the invention may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

Wireless switch 200 typically includes at least some form of computer readable media. Computer readable media can be any available media that can be accessed by wireless switch 200 and/or by applications executed by wireless switch 200. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage (e.g., hard disks) or other magnetic storage devices (e.g., MRAM), or any other medium which can be used to store the desired information and which can accessed by wireless switch 200. Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal.

Referring again to FIG. 2, in its most basic configuration, wireless switch 200 typically includes at least one processing unit 202 and memory 204. Depending on the exact configuration and type of computing system 200, memory 204 may be volatile (such as random access memory (RAM)), non-volatile (such as a hard disk, ROM, flash memory, etc.) and most often some combination of the two. This most basic configuration is identified in FIG. 2 by reference number 206. Additionally, wireless switch 200 may also have additional features/functionality. For example, wireless switch 200 may also include additional storage (removable and/or non-removable) including, but not limited to, magnetic or optical disks or tape. Such additional storage is illustrated in FIG. 2 by removable storage 208 and non-removable storage 210. Memory 204, removable storage 208, and non-removable storage 210 are all examples of computer storage media as defined above.

Wireless switch 200 also includes communications connection(s) 212 that allow the system to communicate with other network devices, such as access ports (APs) 14-46 and layer 3 routers 52-56, over interfaces 214. Communications connection(s) 212 may be associated with the handling of communication media as defined above. In one implementation each communications connection(s) 212 can include one or more network adapters that include transceiver and modem functionality. As used herein, the term "network adapter" can refer to computer hardware designed to allow computers to communicate over a computer network. The network adapters can comprise, for example, a communications modem, wired and/or wireless transceivers, and/or any other devices that can communicate over, for example, an IP network.

A wireless switch device includes wired Ethernet interfaces for a plurality of access ports it supports, and serves as a termination point for a "wireless" protocol, such as the IEEE 802.11 protocol. To explain further, client device(s) communicate with an AP over the air via wireless packets (e.g., IEEE 802.11 data packets), and the AP passes the wireless packets to the wireless switch over a wire that connects the wireless switch and the AP. In other words, the wireless switch communicates wireless packets encapsulated in wired packets (e.g., IEEE 802.11 packets encapsulated in IEEE 802.3 packets) with the AP. A wireless switch device receives data packets, going to or received from one of its connected access ports, and processes those data packets, which would have traditionally been processed by a "thick" access point. A packet forwarding module of a wireless switch device forwards those data packets based on information contained in their L2 headers, which for a wireless switch are headers corresponding to L2 wireless networking protocols including IEEE 802.11, etc. For instance, in the context of IEEE 802.11 networks, a wireless switch decapsulates inbound IEEE 802.11 data packets received from client device via an access port into IEEE 802.3 packets, and converts/encapsulates outbound IEEE 802.3 packets destined for a client device into IEEE 802.11 data packets before passing them on to an AP for transmission to the wireless client device. The wireless switch then Layer-2 switches the resulting 802.3 packet onto the wire. If the 802.3 packet is destined to the wireless switch itself, then the wireless switch routes the IP packet based on its "routing table." In addition to Layer 2 (L2) switching and Layer 3 (L3) or IP routing of data packets, a wireless switch (WS) also performs a number of additional services/functions as illustrated in FIG. 3.

FIG. 3 is a list of services/functions provided by or performed by a wireless switch device according to one exemplary embodiment. In FIG. 3, column 1 310 lists categories 312-328 of services/functions performed by a wireless switch device and column 2 330 specifies services/functions 332-348 in each of the categories 312-328. Categories 312-328 of services/functions include networking services 312, wireless services 314, configuration services 316, security services 318, administration services 320, application services 322, high availability services 324, packet forwarding services 326, and system management services 328.

The networking services/functions 312, 332 include Layer 2 interface management of physical ports, Layer 3 interface management of IP Interfaces, Domain Name System (DNS) service, Dynamic Host Configuration Protocol (DHCP) Client, DHCP Server, and route-table management.

The wireless services/functions 314, 334 include access port configuration services/functions, access port management services/functions, wireless client device configuration services/functions, wireless client device database management services/functions, WLAN configuration services/functions, WLAN management services/functions, Layer 3 or IP mobility service, and wireless hotspot service.

The configuration services/functions 316, 336 include configuration management, and firmware image management.

The security services/functions 318, 338 include security functions (such as IEEE 802.11i, IP Security (IPsec), Virtual Private Network (VPN), SSL VPNs), DOS Attack detection, Wireless Intrusion Detection System (WIDS) functions, stateful and stateless packet filtering using access-lists, firewall services/functions (e.g., role-based firewall), Authentication/Authorization/Accounting (AAA) client, Remote Authentication Dial In User Service (RADIUS) Server (or a AAA server), user management, and password management. The administration services/functions 320 include Command Line Interface (CLI), Simple Network Management Protocol (SNMP) server, monitoring, events, alarms, Telnet/secure shell (SSH)/Hypertext Transfer Protocol (HTTP), Hypertext Transfer Protocol over Secure Socket Layer (HTTPS), Trivial File Transfer Protocol (TFTP), File Transfer Protocol (FTP), Secure Copy protocol (SCP), SSH File Transfer Protocol (SFTP) services/functions, certificate management, syslog server, debugging, tracing, and archiving.

The application services/functions 322, 342 include Network Time Protocol (NTP) server, real time locationing system, health checking, and statistics. The high availability services/functions 324 include Virtual Router Redundancy Protocol (VRRP) and clustering service.

The packet forwarding services/functions 326, 346 include Layer 2 (L2) switching/bridge modules and Layer 3 (L3) or IP routing modules mentioned above, as well as a wireless (IEEE 802.11) packet forwarder module and a flow or session table forwarding module.

The system management services/functions 328, 348 include process monitoring for monitoring all other processes running in the system, Central Processing Unit (CPU) management, and memory management.

Figure 4:
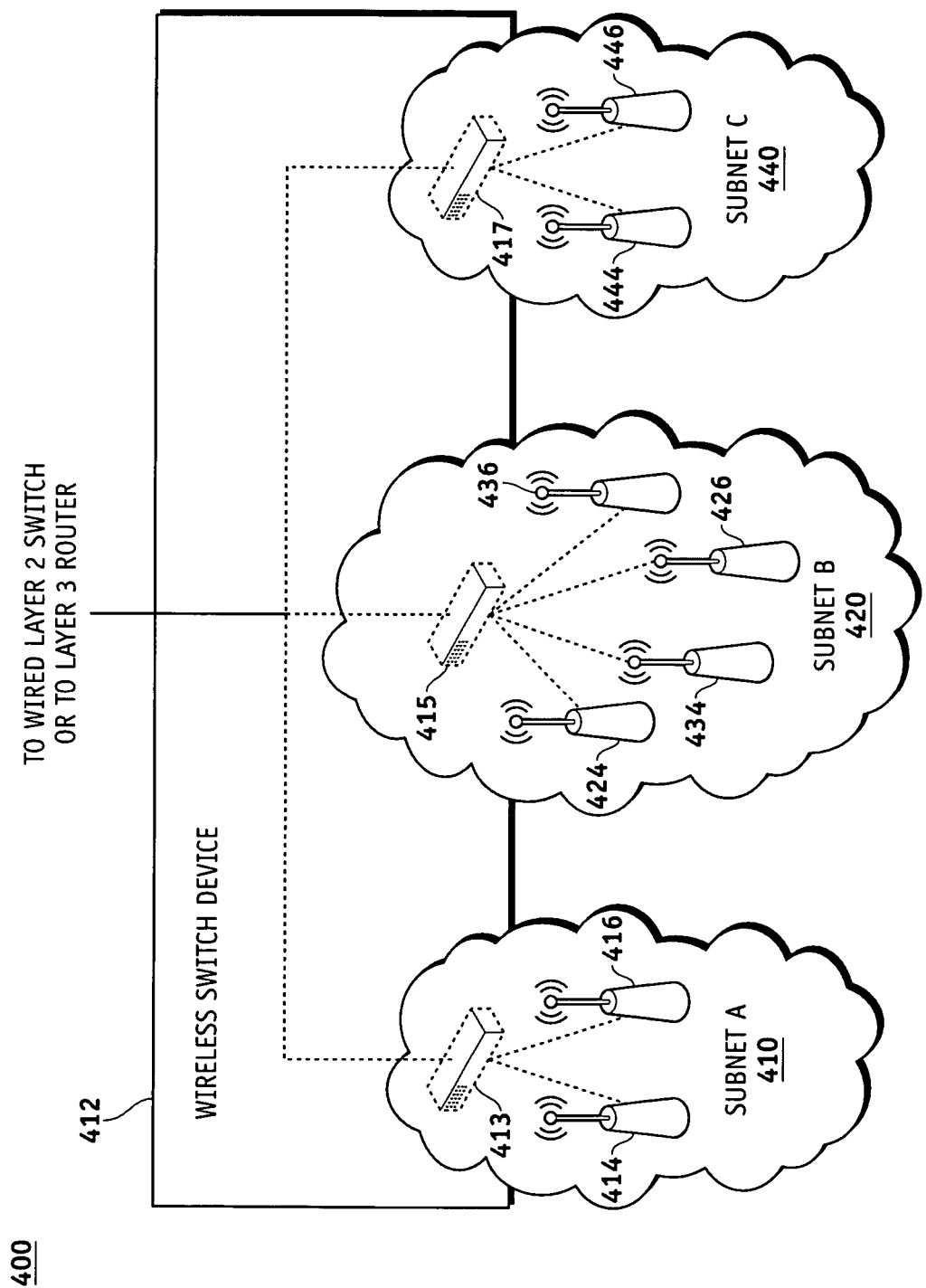
FIG. 4 is a simplified block diagram of a wireless switch device implemented in a wireless local area network (WLAN) according to one exemplary embodiment.

FIG. 4 is a simplified block diagram of a wireless local area network (WLAN) 400 according to one exemplary embodiment. The WLAN 400 shown in FIG. 4 comprises a wireless switch device 412 and a plurality of access ports 414, 416, 424, 426, 434, 436, 444, 446. Although not illustrated in FIG. 4, the wireless switch device 412 can be indirectly coupled to a wired host system (not illustrated) by another network entity (not illustrated) such as a L2 switch device or a L3 router.

To save costs associated with deploying multiple wireless switch devices, embodiments of the present invention utilize virtualization technologies that allow a single physical wireless switch device 412 to be virtually divided into multiple virtual wireless switch modules (VWSMs) 413, 415, 417 that run on or within the single physical wireless switch device. As used herein, the term "Virtual Wireless Switch Module (VWSM)" refers to a virtual wireless switch module that is implemented within a single physical wireless switch device or other host system along with other virtual wireless switch modules.

As described above with respect to FIGS. 2 and 3, a wireless switch device includes hardware, middleware and software resources in a single unit or housing. The hardware resources are virtually divided among a group of virtual wireless switch modules 413, 415, 417. Each VWSM 413, 415, 417 includes services/functionality similar to that of the wireless switch device. VWSMs 413, 415, 417 can be connected to each other and to external networks via one or more physical Ethernet adapters (not illustrated) associated therewith. Each of the Ethernet adapters has its own MAC address. From a networking standpoint the VWSMs 413, 415, 417 have the same properties as physical wireless switch devices. VWSM 413, 415, 417 on the same host machine can communicate with other network devices and with each other using the same protocols that would normally be used with a wireless switch device without the need for additional hardware. VWSMs 413, 415, 417 can also be networked together to create a network of VWSMs.

By implementing virtual wireless switch modules in a single physical wireless switch device, resources of the single physical wireless switch device can be leveraged. Each of the VWSMs share resources of the physical wireless switch device, such as core central processing units, hardware switching capacity, interfaces, access ports, memory, peripherals, etc. and can function as its own wireless switch device. One example of how resources of a wireless switch can be virtually divided among a group of virtual wireless switch modules will be described below with reference to FIG. 5.

Figure 5:
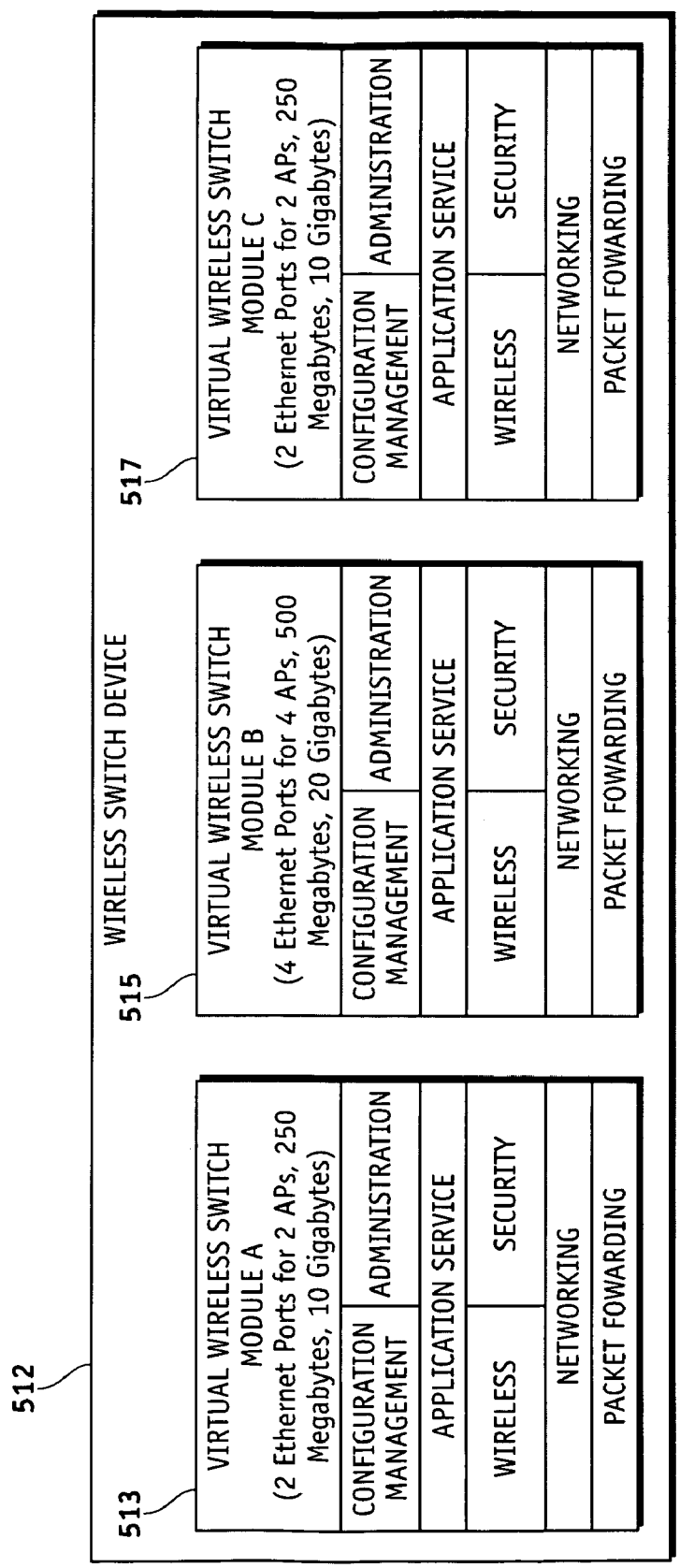
FIG. 5 illustrates a wireless switch device that includes multiple virtual wireless switch modules (VWSMs) in which resources of a wireless switch device are virtually divided among the multiple VWSMs according to one non-limiting exemplary embodiment.

FIG. 5 illustrates resources of a physical wireless switch device 512 that are virtually divided among multiple virtual wireless switch modules (VWSMs) 513, 515, 517 according to one non-limiting exemplary embodiment.

In this example, physical resources of the physical wireless switch device 512 include: eight (8) physical Ethernet ports, four (4) core central processing units (CPUs), one (1) Gigabyte of random access memory (RAM), and a hard disk having forty (40) Gigabytes of storage space. Each of the eight (8) physical Ethernet ports can be coupled (either directly or indirectly via an intermediate device) to a corresponding access port, and each access port has one or more radio units for wirelessly communicating over-the-air (OTA) with wireless client devices that are in communication range of that access port.

In this particular example, the physical resources of the physical wireless switch device 512 are virtually divided among the virtual wireless switch modules (VWSMs) 513, 515, 517 as follows: VWSM A 513 is allocated one core processor, two (2) Ethernet ports for two (2) access ports, two-hundred and fifty (250) Megabytes of RAM and ten (10) Gigabytes of hard disk space; VWSM B 515 is allocated two core processors, four (4) Ethernet ports for four (4) access ports, five-hundred (500) Megabytes of RAM and twenty (20) Gigabytes of hard disk space; and VWSM C 517 is allocated one core processor, two (2) Ethernet ports for two (2) access ports, two-hundred and fifty (250) Megabytes of RAM and ten (10) Gigabytes of hard disk space.

In addition to these physical resources that are allocated to each VWSM 513, 515, 517, each of the virtual wireless switch modules (VWSMs) 513, 515, 517 can provide services/functionalities described with reference to FIG. 3, which in this example are illustrated as networking services, wireless services, configuration services, security services, administration services, application services, and packet forwarding services, and system management services. All of these services/functionalities are fully virtualized and a fully functional instance of each of these services/functionalities are available to each VWSM 513, 515, 517.

Example Use Cases

A wireless switch device 512 with a plurality of virtual wireless switch modules (VWSMs) 513, 515, 517 can be used in a number of different scenarios. For instance, a Wireless Internet Service Provider (WISP) can use the wireless switch device 512 to provide wireless services to multiple independently operating customers, such as smaller ISPs or even small enterprises that have outsourced their WLAN services to the WISP. The WISP can virtually divide a single physical wireless switch device into multiple virtual wireless switch modules for each customer by setting up appropriate device-configuration parameters such as memory, CPU processing power, interfaces, access ports, etc. Each of the VWSM(s) terminate the wireless connection and route/switch traffic through the WISP's network to the Internet. The customers are also given the capability to configure and manage their VWSM parameters such as wireless configuration, security policies, IP addressing/routing/switching of their VWSMs. This way the WISP could support multiple customers on a single physical wireless switch device 512 platform without limitations on the configuration capabilities such as security policies, WLAN configuration, switching capacity, non-overlapping VLANs/IP-addresses, etc. When a particular customer has more than one VWSM assigned to them, then redundant wireless switching capability can be provided to that customer on a single physical platform.

Resources of the physical wireless switch device can be more fully utilized or utilized in a more optimal manner. For example, a physical resource on the physical wireless switch device like a CPU core, that is unused currently by one virtual wireless switch module could potentially be used by another virtual wireless switch module. Moreover, if one of VWSM were to fail all the customers would not be affected. In addition, because the number of physical wireless switch devices that are deployed is reduced, network administration and management tasks are significantly easier. For instance, firmware and configuration upgrades are much more easily managed. In addition, the cost and time required when adding or removing new customers is significantly reduced since there is no new hardware to be installed.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention. Thus, to the extent the description refers to certain features being "connected" or "coupled" together, unless expressly stated otherwise, "connected" or "coupled" means that one feature is directly or indirectly connected or coupled to another feature, and not necessarily mechanically. Although drawings depict exemplary arrangements of elements, additional intervening elements, devices, features, or components may be present in an actual embodiment assuming that the functionality of the circuit is not adversely affected. The connecting lines shown in the various figures represent example functional relationships and/or physical couplings between the various elements. Many alternative or additional functional relationships or physical connections may be present in a practical embodiment or implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, while the techniques and technologies described above have been described in the context of WLANs which in include wireless switches and access points (APs), it will be appreciated that these techniques and technologies can also be applied in environments where wireless switches are not utilized or where the functionality of the wireless switch is implemented within an access point (i.e., in a "fat" MAC access point). For instance, these techniques and technologies can be applied in a network which does not include separate wireless switch devices, but instead uses fat access points that have all of the functionality of a wireless switch device and one or more access ports merged together in one integrated unit.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A wireless local area network, comprising:
    a plurality of access ports, comprising: a first group of access ports and a second group of access ports;
    a wireless switch device comprising a plurality of virtual wireless switch modules (VWSMs), and a plurality of wired Ethernet interfaces, comprising:
    a first VWSM, coupled to the first group of access ports, via a first group of the wired Ethernet interfaces allocated to the first VWSM, wherein the first VWSM controls the first group of access ports, associated with the first VWSM;
    a second VWSM, coupled to the second group of access ports via a second group of the wired Ethernet interfaces allocated to the second VWSM, wherein the second VWSM controls the second group of access ports associated with the second VWSM; and
    a management module designed to individually manage the plurality of VWSMs independently of each other, wherein the management module comprises:
        an access port configuration sub-module designed to configure the plurality of access ports;
        an access port management sub-module designed to manage the plurality of access ports; and
        a wireless client device management sub-module designed to manage wireless client devices communicating via any of the VWSMs.

2. A wireless local area network according to claim 1, wherein the first VWSM is designed to communicate wireless packets with the first group of access ports, and is designed to serve as a termination point for a wireless protocol.

3. A wireless local area network according to claim 1, wherein the first VWSM comprises a first wireless packet forwarding module that is designed to:
    receive an inbound wireless packet from a wireless client device from the first access port, decapsulate the inbound wireless packet to generate IEEE 802.3 packet, determine a destination MAC address from layer 2 (L2) header information in the IEEE 802.3 packet, layer 3 (L3) route the IEEE 802.3 packet to a next-hop destination if the destination MAC address in L2 header of the IEEE 802.3 packet is the same as a MAC address of the first VWSM, and switch the IEEE 802.3 packet over a wire to one of a layer 2 (L2) entity and a layer 3 (L3) entity if the destination MAC address in L2 header of the IEEE 802.3 packet is different than a MAC address of the first VWSM; and
    receive outbound IEEE 802.3 packets destined for a wireless client device, encapsulate the outbound IEEE 802.3 packets to generate wireless packets, and send the wireless packets to one of the first group of access ports, for transmission to the wireless client device.

4. A wireless local area network according to claim 3, wherein the wireless packets are IEEE 802.11 data packets.

5. A wireless local area network according to claim 1, wherein the wireless switch device comprises a set of physical resources, wherein a first portion of the set of physical resources are allocated to the first VWSM, and wherein a second portion of the set of physical resources are allocated to the second VWSM.

6. A wireless local area network according to claim 1, wherein the wireless switch device comprises:
    a plurality of core central processing units comprising:
        a first core central processing unit allocated to the first VWSM, and
        a second core central processing unit allocated to the second VWSM.

7. A wireless local area network according to claim 1, wherein the wireless switch device comprises:
    Random Access Memory (RAM) having a first amount of storage capacity, wherein:
        a first portion of the first amount of storage capacity is allocated to the first VWSM, and
        a second portion of the first amount of storage capacity is allocated to the second VWSM.

8. A wireless local area network according to claim 1, wherein the wireless switch device comprises:
    a non-volatile storage device having a second amount of storage capacity, wherein:
        a first portion of the second amount of storage capacity is allocated to the first VWSM, and
        a second portion of the second amount of storage capacity is allocated to the second VWSM.

9. A wireless local area network according to claim 1, wherein the wireless switch device comprises:
    a single physical wireless switch device implemented within a single housing, and wherein the plurality of virtual wireless switch modules (VWSMs) run within the single physical wireless switch device.

10. A wireless local area network according to claim 1, further comprising:
    a L2 switch device coupled to the wireless switch device;
    a L3 router coupled to the L2 switch; and
    a wired host system coupled to the L3 router.

11. A wireless local area network according to claim 10, wherein the wireless switch device comprises:
    a plurality of Ethernet ports comprising:
    a first group of Ethernet ports allocated to the first VWSM, the first group of Ethernet ports being coupled to the first group of access ports; and
    a second group of Ethernet ports allocated to the second VWSM, the second group of Ethernet ports being coupled to the second group of access ports.

12. A wireless local area network according to claim 1, wherein the first VWSM further comprises a first networking service module, a first wireless service module, a first configuration service module, a first security service module, a first administration service module, and a first application service module, and wherein the second VWSM further comprises a second networking service module that operates independently of the first networking service module, a second wireless service module that operates independently of the first wireless service module, a second configuration service module that operates independently of the first configuration service module, a second security service module that operates independently of the first security service module, a second administration service module that operates independently of the first administration service module, and a second application service module that operates independently of the first application service module.

* * * * *

UNITED STATES PATENT AND TRADEMARK OFFICE
CERTIFICATE OF CORRECTION

PATENT NO.        : 8,036,161 B2
APPLICATION NO.   : 12/182852
DATED             : October 11, 2011
INVENTOR(S)       : Nagarajan It is certified that error appears in the above-identified patent and that said Letters Patent is hereby corrected as shown below:

On Page 2, in Field (56), under "OTHER PUBLICATIONS", in Column 1, Line 26, delete "1paragraph 2" and insert -- 1–paragraph 2 --, therefor.

On Page 2, in Field (56), under "OTHER PUBLICATIONS", in Column 1, Line 28, delete "example" and insert -- examples --, therefor.

On Page 2, in Field (56), under "OTHER PUBLICATIONS", in Column 2, Line 16, delete "ITEF," and insert -- IETF, --, therefor.

On Page 2, in Field (56), under "OTHER PUBLICATIONS", in Column 2, Line 26, delete "(TBRPF);" and insert -- (TDBRPF); --, therefor.

On Page 2, in Field (56), under "OTHER PUBLICATIONS", in Column 2, Line 26, delete "Engineernig" and insert -- Engineering --, therefor.

On Page 2, in Field (56), under "OTHER PUBLICATIONS", in Column 2, Line 34, delete "PCT/SU2007/073917" and insert -- PCT/US2007/073917 --, therefor.

In Fig. 3, Sheet 3 of 5, for Tag "332", in Line 2, delete "Lyere" and insert -- Layer --, therefor.

In Fig. 3, Sheet 3 of 5, for Tag "340", in Line 5, delete "Managment" and insert -- Management --, therefor.

In Fig. 3, Sheet 3 of 5, for Tag "348", in Line 3, delete "Managment" and insert -- Management --, therefor.

Signed and Sealed this
Eighteenth Day of December, 2012

David J. Kappos
*Director of the United States Patent and Trademark Office*